United States Patent Office 3,188,214
Patented June 8, 1965

3,188,214
SAUSAGE MANUFACTURE
Robert H. Harper, Park Forest, Ill., assignor to Swift & Company, Chicago, Ill., a corporation of Illinois
No Drawing. Filed Mar. 27, 1961, Ser. No. 98,314
5 Claims. (Cl. 99—109)

This invention relates to a method of producing sausage products. More particularly, this invention relates to an improved method of setting up and cooking sausage products.

The traditional methods of making sausage products were based on the general steps of stuffing a prepared mix into a casing and then slowly smoking and cooking the encased products in a smoke house. Depending on the type of sausage desired, various other steps were added. These traditional methods were time-consuming processes involving extensive handling and spacious manufacturing areas.

The increasing costs of labor, material, and manufacturing facilities have focused considerable attention on improving the methods of sausage manufacture. Some of these improvements have been directed to shortening or eliminating the time-consuming smoking and cooking processes, while others have been directed to eliminating the stuffing procedure. One important development was the discovery that the emulsion may be set up without slow cooking. Setting up is the phenomenon whereby heat at least partly coagulates the emulsion, causing the emulsion to hold its own shape during normal handling or in other words, to become self-sustaining. Improvement efforts have been hampered by the fact that the public has demanded sausages having the texture, taste and appearance characteristic of sausages prepared in the traditional manner. Many of the resulting improvements have, therefore, required that the emulsion be first set up in costly molds or temporary casings, then removed from the molds or casings and smoked or cooked. In order to eliminate the need for molds and casings, it has been suggested that sausages be produced by passing the emulsion through nozzles; freezing the surface of the sausage; and immersing the frozen sausage links in a hot liquid bath to form a surface crust thereon. While this procedure eliminates the need for molds, it in turn requires costly freezing equipment, and considerable handling.

As a net result, though many improvements have been made, the forming and cooking steps of sausage manufacturing still entail the use of costly equipment, excessive labor, and time-consuming processes.

It is therefore an object of this invention to provide an improved process for manufacturing a sausage product whereby the processing time, handling costs, and equipment costs are substantially reduced, while at the same time the advantages of the traditional method are retained.

A further object of this invention is to provide an improved process for setting up a sausage emulsion.

Another object of this invention is to provide an improved process for setting up and cooking a sausage emulsion in one operation.

Additional objects, if not specifically set forth herein, will be readily apparent to one skilled in the art from the following detailed description of the invention.

Briefly, this invention is concerned with a process for the manufacturing of cooked sausages without stuffing the emulsion into molds or casings, which includes a step wherein a formed sausage emulsion is introduced into a hot bath. The emulsion is kept in contact with the bath until the emulsion has coagulated and is completely cooked. Alternatively, the emulsion may be removed from the bath after it has coagulated sufficiently to become self-sustaining and is then further cooked by conventional methods.

In accordance with the invention, a sausage emulsion, which is of fluid consistency, is pumped through a tube into a hot cooking bath which is maintained at a temperature between about 225° F. and about 295° F. The term "fluid consistency" is used herein to described the normal physical condition of an emulsion as opposed to the physical condition of an emulsion which has been frozen. The cooking bath may be any nontoxic cooking medium such as brine, cooking fat, or cooking oil. If the emulsion is extruded directly from the emulsifier into the bath, it should be cured with a quick cure such as nitric oxide. If there is to be a delay between emulsification and heating, other curing agents may be used. As the emulsion enters the bath, it is set up almost instantaneously. Links may be formed by crimping the emulsion while it is still below the surface of the bath, with the liquid of the bath acting to lubricate the sausage at the point at which it is crimped. If desired, the emulsion may be removed from the bath after it has set up and then further processed and cooked in the conventional manner. Preferably, the links are kept in the bath for a sufficient time to allow the heat of the bath to both set up and cook the emulsion, and then they are removed, drained, cleaned and smoked if liquid smoke has not been previously added as an ingredient.

In the past, it has been thought that if a raw sausage emulsion was extruded directly into a liquid bath without having been previously frozen, the sausage produced would have poor flavor because of excessive absorption of the liquid. However, the temperature of the bath in the instant method causes moisture to evolve from the emulsion. This moisture evolution holds the liquid absorption to a minimum, and therefore, the sausage produced has the desired traditional flavor.

The instant methods may be used with frankfurters, bologna, pickle-pimento loaf, salami, precooked pork sausage, Braunschweiger, canned meat loaves, and other similar comminuted meat products which depend upon protein coagulation to make the fluid mass self-sustaining. Since these products will be of a variety of sizes and shapes, the minimum times for setting up and cooking will vary according to the diameter of the individual product and hence these times in themselves will not be critical. In the setting up version of my method, the sausage may be removed when sufficient coagulation has taken place to cause the emulsion to become self-sustaining. In the cooking version of my method, the sausage may be removed when its internal temperature has been raised to at least about 160° F. If it is desired to have specific times for setting up or cooking a particular size sausage, these times may be determined by measuring how long it takes that specific size to become self-sustaining or to reach an internal temperature of about 160° F. at the desired bath temperature. The following table illustrates the temperature range within which an acceptable frankfurter may be produced, the minimum time for set up at a given temperature range, and the minimum time for producing a completely cooked frank at that temperature. The product is completely cooked when its internal temperature is raised to at least about 160° F.

| Temperature of Bath (° F.) | Set Up Time (minutes) | Complete Cooking Time (minutes) |
|---|---|---|
| 205–208 | 0.16 | 11.5 |
| 210–212 | 0.15 | 11.1 |
| 215–220 | 0.14 | 10.0 |
| 225–230 | 0.13 | 8.9 |
| 230–235 | 0.12 | 7.7 |
| 240–245 | 0.11 | 6.5 |
| 255–260 | 0.09 | 6.0 |
| 265–270 | 0.08 | 5.8 |
| 270–275 | 0.06 | 5.4 |
| 275–280 | 0.05 | 4.9 |
| 290–295 | 0.04 | 4.5 |
| 300–305 | 0.02 | 3.9 |

The franks produced below 212° F. were undesirable because of excessive absorption of fat. This absorption was reduced considerably at 225° F. and essentially disappeared at 230° F. An acceptable product was received from about 225° to about 295° F. with the time for setting up being at least 0.04 minute and the time to complete cooking being at least about 4.5 minutes; the preferred temperature range, in order to produce a product most representative of the best products produced by conventional methods, was found to be from about 235 to about 275° F. Products otherwise quite satisfactory showed excessive fat absorption and development of expected flavor characteristics at temperatures below 235° F. becoming definitely noticeable at 220° and objectionable at 212° F. On the other hand, temperatures about 275° F. resulted in crusty surfaces. While perhaps quite tasty to some, the product loses its typical identity at about 300° F. This latter applies to products of smaller diameter such as franks. The same phenomenon occurs with larger products but the objectionable characteristics are not so pronounced.

The following examples are for purposes of illustration and are not intended to limit the invention to the specific embodiments described therein.

Example I

A standard meat mixture for the production of frankfurters was ground, cured with nitric oxide, and emulsified by chopping during the addition of sugar, salt, spices, liquid smoke, and ice. The emulsion was extruded through a stuffing horn into the interior of a bath of hot cooking fat maintained at a temperature of 230° F. to 235° F. Franks were formed from the continuous stream of emulsion by crimping the emulsion into links while it was still under the surface of the bath. The franks were allowed to remain in contact with the bath until their internal temperature had been raised to 160° F. This took 7.7 minutes. The franks were then picked up on a chain belt, raised above the bath, drained, and steam cleaned. The finished franks had the texture, taste and appearance, characteristic of franks prepared in the traditional manner, but they were produced with reduced processing time, handling costs, material costs, and equipment costs when compared with the manufacturing methods heretofore practiced.

Example II

An emulsion prepared as in Example I was extruded through a stuffing horn into a bath of hot cooking oil maintained at a temperature of 240° F. to 245° F. The emulsion was allowed to remain in contact with the bath until it became self-sustaining. This setting up took 0.11 minute. The set up emulsion was then picked up on a conveyor, raised above the bath and further processed by standard procedures. Here again, the finished franks had the traditional texture, taste, and appearance, but were produced with reduced processing time, handling cost, manufacturing area, and equipment costs when compared with the manufacturing methods heretofore practiced.

Example III

A standard mixture for the production of bologna was ground, cured with nitric oxide, and emulsified by chopping during the addition of sugar, salt, spices, liquid smoke, and ice. The emulsion was extruded through a 3½ inch diameter stuffing horn into a bath of hot cooking oil maintained at a temperature of 265° F. to 270° F. Links were formed by crimping the emulsion while it was still below the surface of the cooking medium. The links were allowed to remain in contact with the bath until their internal temperatures had been raised to about 160° F. This took 17 minutes. The links were picked up on a chain belt, raised above the bath, drained and cleaned. The finished product had the traditional taste, texture and appearance, yet the entire process was completed in a matter of minutes and the manufacturing area was relatively small, whereas the traditional bologna process takes hours and uses large manufacturing areas. Further, no casings were used and relatively inexpensive equipment was used as compared with the expensive mold and electronic heating equipment used in other recently developed methods.

It is clear that many modifications and variations of the invention as hereinbefore set forth may be made without departing from its spirit and scope, and therefore only such limitations should be imposed as are indicated in the appended claims.

I claim:

1. An improved method of setting up a sausage emulsion comprising: directly introducing a formed sausage emulsion of fluid consistency into a hot cooking bath maintained within the temperature range of about 225° F. to about 295° F., and keeping the emulsion in contact with the bath until the emulsion has coagulated sufficiently to become self-sustaining.

2. An improved method of producing a cooked sausage product comprising: directly introducing a formed sausage emulsion of fluid consistency into a cooking bath maintained at a temperature within the range of about 225° F. to about 295° F. and keeping the emulsion in contact with the bath until the internal temperature of the sausage is raised to at least about 160° F. to allow the heat of the bath to set up and cook the emulsion.

3. An improved method of producing a cooked sausage product comprising: extruding a sausage emulsion directly into a cooking bath maintained at a temperature within the range of about 225° F. to about 295° F., crimping the emulsion into links while below the surface of the bath, and keeping the emulsion in contact with the bath until the internal temperature of the sausage is raised to at least about 160° F. to allow the heat of the bath to set up and cook the emulsion.

4. An improved method of setting up a frankfurter emulsion comprising: extruding a frankfurter emulsion of fluid consistency into a hot cooking bath, maintained at a temperature within the range of about 225° F. to about 295° F. and keeping the emulsion in contact with the bath for at least about 0.04 minute, whereby the emulsion becomes self-sustaining.

5. An improved method of producing cooked frankfurters comprising: extruding a frankfurter emulsion of fluid consistency into a cooking bath maintained at a temperature within the range of from about 225° F. to about 295° F. and keeping the emulsion in contact with the bath for at least about 4.5 minutes, whereby the emulsion is set up and completely cooked.

References Cited by the Examiner

UNITED STATES PATENTS

| | | | |
|---|---|---|---|
| 1,009,953 | 11/11 | Boyle | 99—109 |
| 2,182,211 | 12/39 | Paddock | 99—109 |
| 2,547,747 | 4/51 | Darrow | 99—107 |
| 2,860,991 | 11/58 | Christianson et al. | 99—109 |
| 2,970,916 | 2/61 | Harper | 99—109 |

FOREIGN PATENTS 855,108 11/60 Great Britain.

A. LOUIS MONACELL, *Primary Examiner.*

HYMAN LORD, *Examiner.*